United States Patent
Young

(10) Patent No.: US 6,507,018 B2
(45) Date of Patent: *Jan. 14, 2003

(54) DITHERLESS NON-UNIFORMITY COMPENSATION FOR INFRARED DETECTOR ARRAYS WITH RECURSIVE SPATIAL LOW PASS FILTERING

(75) Inventor: Ching-ju J. Young, Dallas, TX (US)

(73) Assignee: Raytheon Company, Lexington, MA (US)

( * ) Notice: Subject to any disclaimer, the term of this patent is extended or adjusted under 35 U.S.C. 154(b) by 22 days.

This patent is subject to a terminal disclaimer.

(21) Appl. No.: 09/785,833

(22) Filed: Feb. 16, 2001

(65) Prior Publication Data

US 2001/0042825 A1 Nov. 22, 2001

Related U.S. Application Data

(63) Continuation-in-part of application No. 09/347,242, filed on Jul. 2, 1999, which is a continuation-in-part of application No. 08/918,642, filed on Aug. 22, 1997, now Pat. No. 5,925,880.
(60) Provisional application No. 60/025,077, filed on Aug. 30, 1996.

(51) Int. Cl.[7] .................................................. H01J 40/14
(52) U.S. Cl. ................................... 250/252.1; 250/234
(58) Field of Search .............................. 250/252.1, 234, 250/208.1, 332, 334, 347, 349, 395, 370.08, 370.09; 358/474, 443, 448; 333/138; 600/441, 455

(56) References Cited

U.S. PATENT DOCUMENTS

| 5,144,132 | A | * | 9/1992 | Kitakado | 250/208.1 |
|---|---|---|---|---|---|
| 5,276,319 | A | | 1/1994 | Hepfer et al. | 250/332 |
| 5,514,865 | A | | 5/1996 | O'Neil | 250/208.1 |
| 5,721,427 | A | * | 2/1998 | White et al. | 250/252.1 |
| 5,838,813 | A | | 11/1998 | Kancler et al. | 382/103 |
| 5,925,875 | A | * | 7/1999 | Frey | 250/208.1 |
| 6,018,162 | A | * | 1/2000 | Herbst et al. | 250/332 |
| 6,184,527 | B1 | | 2/2001 | Young | 250/332 |
| 6,212,320 | B1 | * | 4/2002 | Rickman et al. | 385/49 |

FOREIGN PATENT DOCUMENTS

| WO | WO 98/26582 | 6/1998 | H04N/5/217 |
|---|---|---|---|

OTHER PUBLICATIONS

Woolfson M.G., "Electronic LOS Jitter Compensation for Staring Sensor", Westinghouse Electric Corporation, SPIE, vol. 1762, pp. 317–326, Jul. 19, 1992.

* cited by examiner

Primary Examiner—Constantine Hannaher
Assistant Examiner—Otilia Gabor
(74) Attorney, Agent, or Firm—Baker Botts L.L.P.

(57) ABSTRACT

A non-dither spatio-temporal low pass filter method for compensating non-uniformity of the responses of detector elements of an infrared detector array. The methods can be used for one-dimensional scanning arrays and for two-dimensional staring arrays. (FIGS. 3 and 6). First it is determined whether the scene and the detector array have sufficient relative motion for use of a spatio-temporal low pass filter type non-uniformity compensation (NUC) algorithm. If so the NUC algorithm is applied, which recursively uses both spatial and temporal information from near neighbors as a basis to correct fixed pattern noise on the detector array.

46 Claims, 9 Drawing Sheets

DITHERLESS NON-UNIFORMITY COMPENSATION FOR INFRARED DETECTOR ARRAYS WITH RECURSIVE SPATIAL LOW PASS FILTERING

RELATED APPLICATIONS

This application is a continuation-in-part application of application Ser. No. 09/347,242, filed Jul. 2, 1999 and entitled "Improved Methods of Non-Uniformity Compensation for Infrared Detector Arrays", which is a continuation-in-part application of application Ser. No. 08/918,642 filed Aug. 22, 1997 and entitled "Non-Uniformity Compensation for Infrared Detector Arrays", which claims the priority under 35 U.S.C. §119 from provisional application number 60/025,077 filed Aug. 30, 1996 and now issued as U.S. Pat. No. 5,925,880.

TECHNICAL FIELD OF THE INVENTION

The present invention relates generally to infrared detectors, and more particularly to a method of compensating for non-uniformities among detector elements of an infrared detector array.

BACKGROUND OF THE INVENTION

Infrared detectors provide thermal images for temperature measurement and heat detection. They are used for various applications, such as for military, industrial, and medical applications. In its simplest form, an infrared detector is a device, such as a photosensitive diode, that generates an electric current when exposed to infrared radiation. This current is dependent on the intensity and wavelength of the radiation and can be used in many different ways to produce an infrared picture.

Infrared detectors may be configured as a single element (detector), a small array of elements, a long linear array, or a full two-dimensional array. When the detector is a full two-dimensional array, the entire image is recorded at once, and the array is referred to as a "staring" array. However, with smaller arrays, the image is scanned over the array. The small array requires a serial scan to sweep the image in two-dimensions, whereas the linear array requires a "pushbroom" scan to sweep the image across the array in one dimension.

The current produced by an infrared detector is amplified and processed to provide a more useful detector output. The processing reduces interference due to external and internal causes, such as electrical noise.

The ideal response of an infrared detector array is that each detector element exhibit the same linear voltage response for given temperature changes in the irradiation of the array. However, one type interference with a good detector signal is electrical noise due to detector non-uniformity among detector elements. The uniformity differences have both spatially and temporally dependent causes.

A number of methods have been tried for compensating non-uniformity of infrared detector arrays. Generally, all involve some sort of data processing. Some methods use a uniform calibration source, typically using a chopper and controlled temperature. Other methods are scene-based, which means that they use an image comprised of one or more objects or patterns. The scene-based methods may be further categorized into mechanical and non-mechanical methods.

Mechanical methods include methods that use choppers, dither mirrors, or other devices to blur the scene or otherwise induce motion. The "dithered scan" method of non-uniformity compensation is a scene-based mechanical method. The detector array views a scene through suitable optics. During a given time frame, the incident flux is sensed by each detector element. At the end of the time frame, the array data is delivered for processing and the array is displaced ("dithered") a fixed distance, typically a distance equal to the width or height of one detector element, in either the horizontal or vertical direction. Conventional dither scan methods assume the scene flux to be stable throughout the dither cycle. Thus, during the next time frame, each detector element is exposed to the flux seen by one of its neighbors during the prior time frame. These detector pairs can be "linked" analytically, such as by averaging their outputs. By a suitable choice of a dither pattern, each detector can be linked with one or more of its neighbors, to adjust gain and offset differences. Dithered scan methods are described in U.S. Pat. No. 5,925,880, to C. J. Young, et al, entitled "Non-Uniformity Compensation for Infrared Detector Arrays".

Scene-based non mechanical methods are based on continuous scene or platform motion. These methods have included temporal high pass filtering, neural networks, and constant statistics.

SUMMARY OF THE INVENTION

One aspect of the invention is a ditherless method of compensating non-uniformities among detector elements of an infrared detector array. It is first determined whether there is relative motion of the scene and the detector array. If so, a spatial low pass filter type of non-uniformity compensation (NUC) algorithm is performed. This NUC algorithm is characterized by its use of neighborhood averaging to adjust offset differences. The neighborhood averaging uses the sum of "shifted image differences", where shifted images (matrices of detector output values) from a first field and a second field, respectively, are differenced. This sum is divided by four.

The NUC algorithm has various mathematical equivalents. However, these equivalents are common in the sense that a detector element and its neighbors are exposed to scenes that differ due to motion. The algorithms calculate a local response average, which is subtracted from the detector element's output to determine the offset correction for that detector element.

The method is iterative, such that new offset correction updates approach zero, reducing offset errors to smaller and smaller errors. The image can be displayed during the iterations with successively smoothed offset errors, or the display can be delayed until the correction values become stable to some predetermined level.

An advantage of the invention is that it permits use of the same algorithms as are used for dithered scan compensation. With sufficient scene motion, the low pass filter effects of the algorithms remove the fixed pattern noise created by non-uniformities, without the need to dither the detector array. Experimentation with a detector system on board an aircraft has shown that the algorithms are sufficient, without dithering, to remove fixed pattern noise at ground scene, where there is large frame to frame scene motion, as well as at sky, where there is small frame to frame scene motion. At the same time, the image of a dim moving target at distance is preserved.

DETAILED DESCRIPTION OF THE INVENTION

The following description is of methods of compensating for detector element non-uniformities of an infrared detector array. Although it may use the same non-uniformity compensation (NUC) algorithms as dither scan methods, it eliminates the need for mechanical dithering. It is based on a recognition that relative motion between the scene and the detector may eliminate the need for mechanical dithering.

Examples of suitable NUC algorithms are described below, with additional detail set out in U.S. Pat. No. 5,925,880, entitled Non-Uniformity Compensation for Infrared Detector Arrays", to C. J. Young, et al., and in U.S. patent Ser. No. 09/347,242, entitled "Improved Methods of Non-Uniformity Compensation for Infrared Detector Arrays", to C. J. Young, et al., both incorporated by reference herein.

U.S. Pat. No. 5,925,880 describes NUC dither scan methods in which a detector array is mechanically dithered so that two or more neighboring detector elements of the array look at the same location of a scene. A dither motion occurs once per field so that each new field contains pixel values for the same location of the scene but viewed by a different detector element. For purposes of the invention described therein, the scene is assumed stable, so that if there were no gain or offset errors, a pixel value would be the same in both fields even though it was sensed by different detector elements. Then, the fields of pixel data are processed to calculate a gain correction value and an offset correction value for each detector element. The original fields of pixel data are corrected by multiplying each detector element's response by its gain correction and by subtracting its offset correction.

The present invention is directed to applications in which the scene is not assumed stable. As described below, the method involves a determination of whether there is sufficient motion to result in application of NUC algorithms without dithering the detector array.

System Overview

Figure 1A:
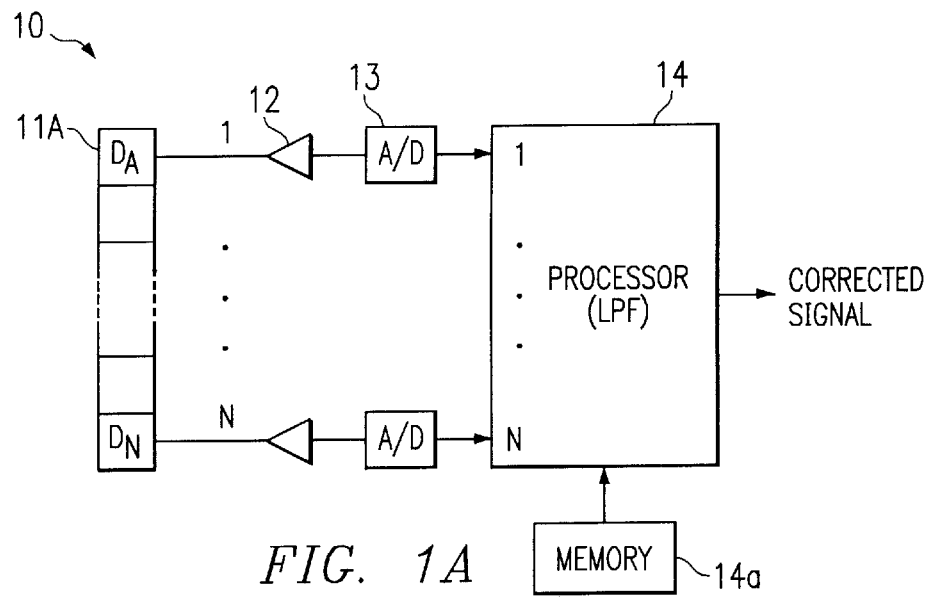
FIGS. 1A and 1B are block diagrams of infrared detector systems in accordance with the invention.

FIG. 1A is a block diagram of a one-dimensional infrared detector system in accordance with the invention. A detector array 11A has a number of individual detector elements $D_{A-N}$. In the embodiment of FIG. 1A, array 11A scans horizontally. However, as explained below, the invention is easily modified for vertical scanning.

Each detector element $D_{A-N}$ of array 11A provides a response signal, indicating flux irradiance, on a separate channel. Each channel has an amplifier 12 and an analog-to-digital converter 13 that samples the signal. The N data signals are delivered in parallel to processor 14. At each time, t, the data received by processor 14 are pixel values representing intensity a given sample time.

It is assumed that the detector elements $D_{A-N}$ of array 11A have non-uniform responses. That is, at least two of the detectors, and probably all of them to one extent or another, do not provide the same response to a given temperature in the scene. The invention is designed to compensate these non-uniformities regardless of whether they are linear or non-linear.

Processor 14 may be any device capable of performing the mathematical operations described below. Therefore, processor 14 might be a general purpose processor programmed to perform the appropriate operations with programming stored in a memory 14a. Or processor 14 might be dedicated logic circuitry or of some combination of software and hardware driven devices.

The output of processor 14 is a corrected signal, from which an image can be generated. The embodiments of this description are designed to provide real time correction for displayed images, but the same method could be used for stored image data.

Figure 1C:
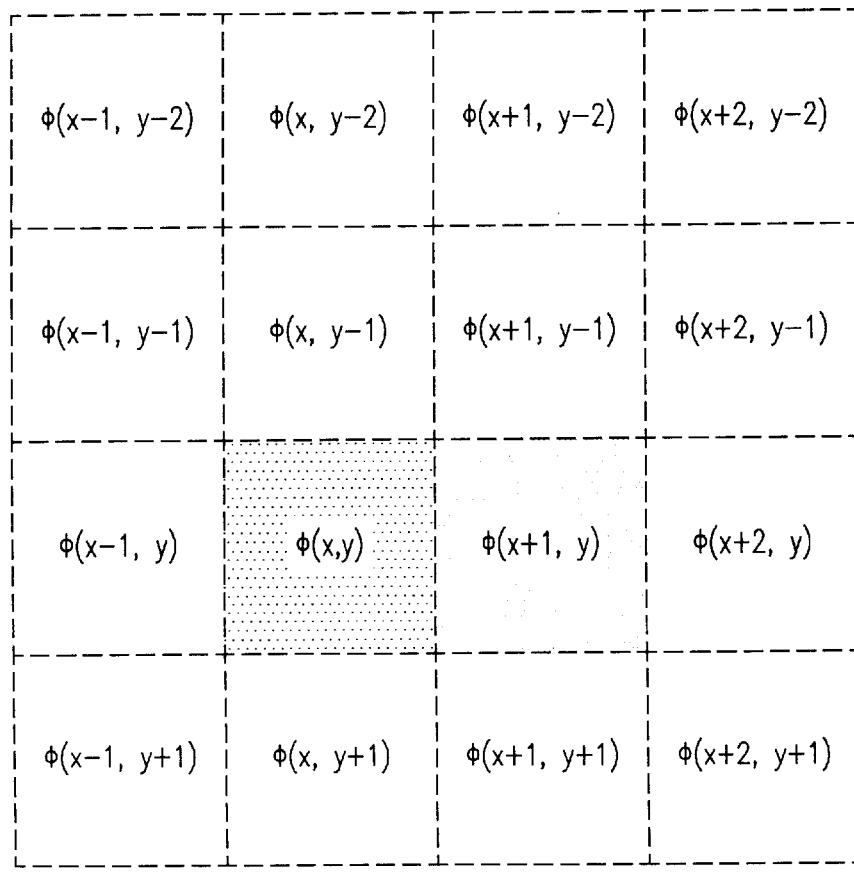
FIG. 1C illustrates a portion of a scene to be viewed by a one dimensional or two dimensional detector array.
Figure 1B:
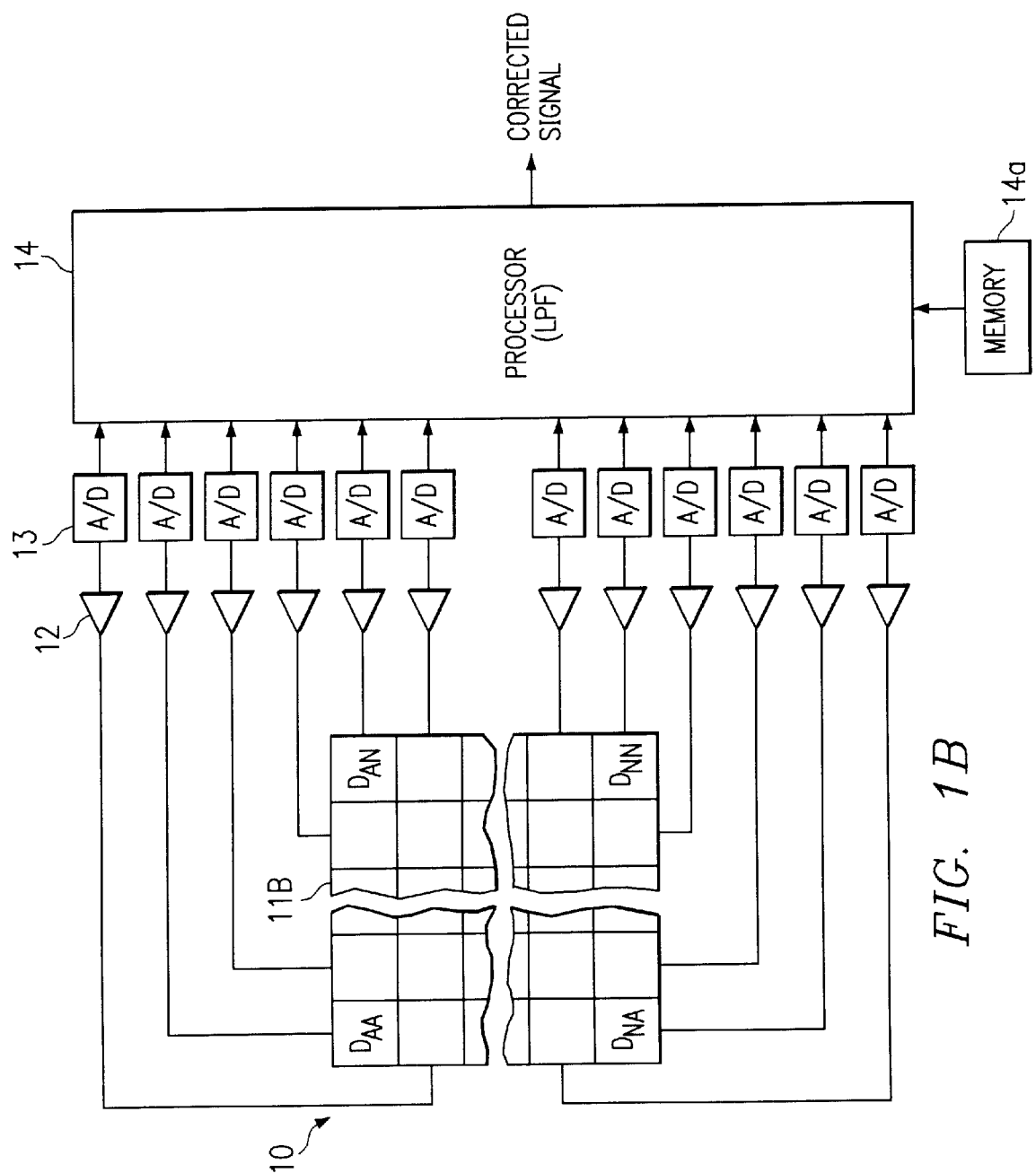

FIG. 1B illustrates a two dimensional detector system, also identified as system 10. The basic elements of the system are the same as in FIG. 1A, except that the detector array 11B is a two-dimensional array. Such arrays are sometimes referred to as "staring" arrays because there is no need for scanning as in the case of one-dimensional arrays. As explained below, the essential concepts of the NUC algorithms described herein apply to both one-dimensional and two-dimensional arrays.

FIG. 1C illustrates a portion of a scene to be viewed by a detector array, such as array 11A or array 11B. The scene is divided into a number of pixels, each representing an area whose irradiance flux is sensed by a detector element of the array. For simplicity of illustration, only the pixels sensed by a 4×4 portion of detector elements are explicitly illustrated. In practice, a number of pixels corresponding to a scan (or stare) of the array comprises an image "field". The true flux incident upon each pixel, indexed by (x,y) coordinates, is (x,y). The pixel values for two adjacent pixels, at (x,y) and at (x+1,y), are shown as being light grey and dark grey, respectively.

Ditherless NUC

For applications in which there is relative motion between the scene and the detector array, NUC processing may be performed without mechanical dithering. More specifically, the pattern noise that results from non-uniformity of detector elements can be removed using the NUC algorithms, if either the scene or the detector array (or both) are in motion. For example, pixel data acquired by a detector mounted on an aircraft may be successfully processed with NUC algorithms. In the case of the latter, the motion is random, but in other applications, the motion could be induced.

Figure 2A:
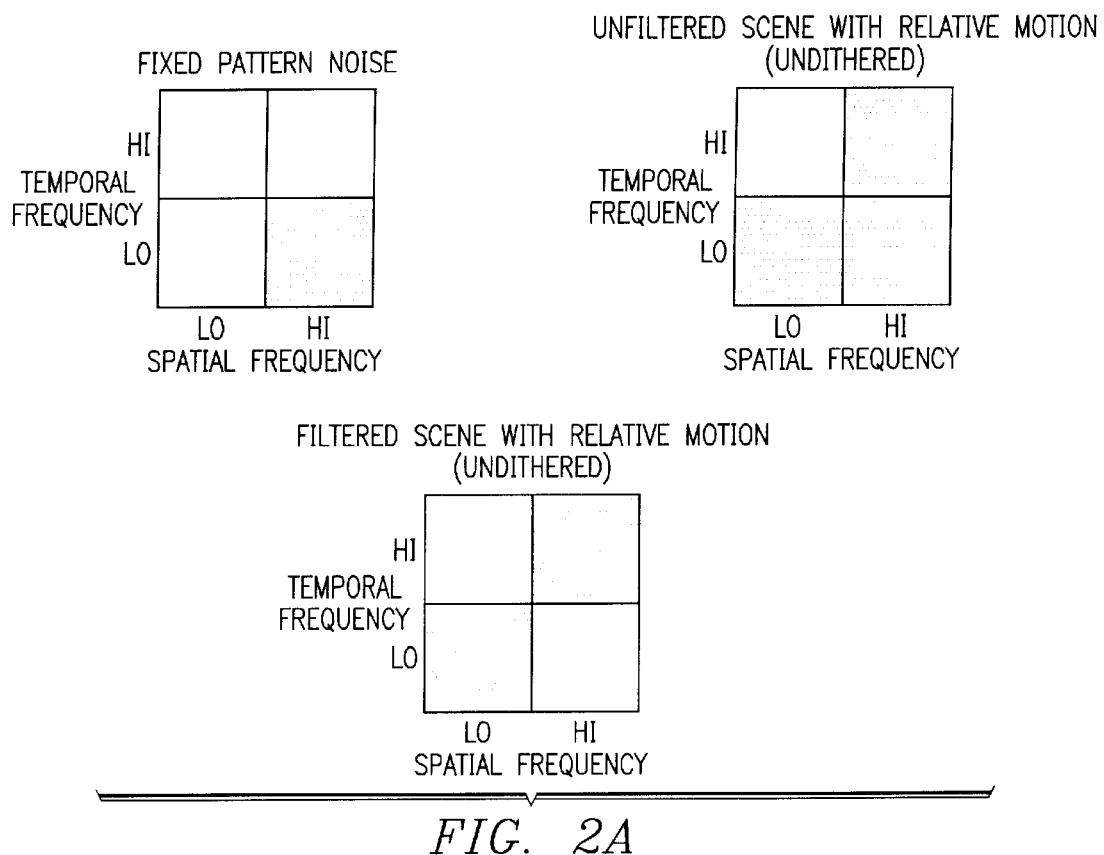
FIG. 2A illustrates how fixed pattern noise from detector non-uniformity, and image characteristics, can be analyzed in terms of frequency quadrants.

FIG. 2A illustrates how fixed pattern noise (FPN) from detector non-uniformity, and image characteristics, can be analyzed in terms of frequency quadrants. The fixed pattern noise is high frequency in spatial domain, but low frequency in temporal domain.

The scene may have both low spatial frequency contents (such as clouds, sky, background at distance) and high spatial frequency information (such as buildings, bridges, and other man made objects). The latter contents are usually of more interest to the observer. If there is no motion, all low spatial frequency and high spatial frequency scenes will be stationary, i.e. not changing its pixel (detector element) location rapidly from one field to the next. This is temporally low frequency.

From FIG. 2A, a scene resides in the LL and LR quadrants and FPN resides in the LR quadrant. This is how FPN interferes with high spatial frequency scene (especially point source targets, such as an aircraft at distance). It can be corrected to get a clearer image.

If there is motion, it has little effects to low spatial frequency scene. A detector element seeing a cloud at time t, will continue to see the cloud temperature at t+1, . . . , t+n, if the patch of cloud moves. However, scene motion will cause high spatial frequency object to be seen by a detector element at t, but not visible by the detector at t+1. Motion causes the object to change its position to be seen by a neighboring detector element. When a detector element sees the hot object at t, and then sees the cold background at t+1, the result is high temporal frequency (the received signals for this detector element change from field to field).

Thus, motion pushes the high spatial frequency scene from low temporal frequency quadrant (LR quadrant) to high temporal frequency quadrant (UR quadrant). Now the scene is in the LL and UR quadrants and fixed pattern noise is still in LR quadrant, thus FPN can be separated from the scene with a spatial low pass filter algorithm.

As illustrated, the NUC algorithms described herein suppress the high spatial frequency fixed pattern noise, without undue effect on high spatial frequency scene contents. High frequency scene objects are temporally uncorrelated as a result of scene motion so that temporally correlated fixed pattern noise can be removed.

The presence of relative motion can be derived from system parameters or from known predefined platform motion. A system such as illustrated in FIG. 1A or 1B is sometimes referred to as the "platform".

Motion can be detected using motion detection algorithms. A difference image may be derived from a current frame and a previous frame to determine if sufficient motion is present for correction without mechanical dithering. The mean of the absolute value of the difference image may be used as an indicator for determining if sufficient scene motion exists. Specifically, when the mean of the absolute value is greater than a pre-determined threshold of temporal noise, then conditions are deemed appropriate for good correction with a NUC algorithm.

The motion detection may be "global" in the sense that it uses data from the whole scene. Alternatively, it may be useful to use "partial-scene" motion detection, where only part of a scene is evaluated to determine if there is motion. For example, a detector might be looking out a window, where only a center portion of the scene is of interest.

As explained below, for offset correction, the NUC algorithms are small step (near neighbors only) and bi-directional (neighbors from opposite directions). To cover two-dimensional arrays, the algorithms are orthogonal (alternating horizontal one dimension and vertical one dimension processing). The algorithms are also recursive (near neighbor processing gradually grows to a larger neighborhood and eventually reaches the entire array).

Local gradient data may be used to identify scene gradient pixels, to limit the amount of correction applied to the pixel when a motion generated scene gradient exceeds a threshold. The difference image may be used to identify detector elements with moving scene objects, where the local gradient is dominated by a scene gradient rather than fixed pattern noise. The correction may be locally disabled to prevent scene content from being removed by the correction process.

A weighting factor (0<alpha<1) may also be used. This weighted correction slows down convergence and to prevent scene details from being erased during the correction process.

Gain correction can be performed as well as offset correction, without dithering, when there is scene or platform motion. However, it has been experimentally determined that gain correction may not be critical, if offset correction is performed as described above.

Figure 2B:
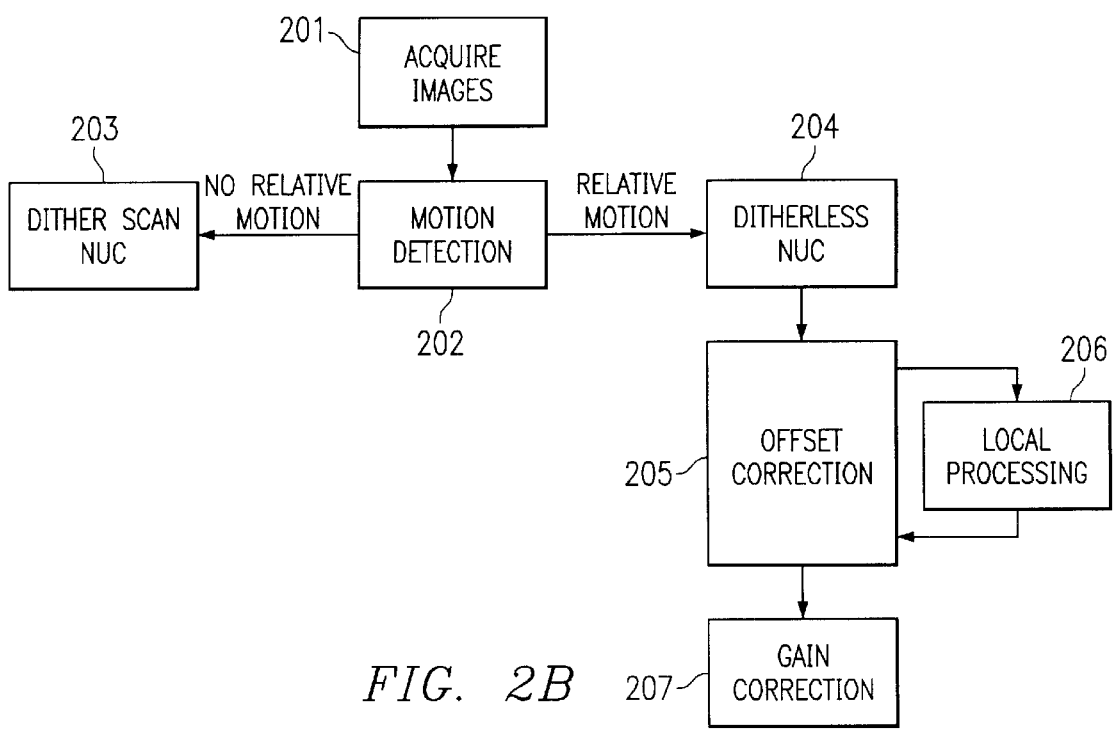
FIG. 2B illustrates the basic steps of ditherless non-uniformity compensation in accordance with the invention.

FIG. 2B illustrates the basic steps of ditherless non-uniformity compensation, using low pass filter type NUC algorithms. In Step 201, two or more fields of data are acquired using the detector array. In Step 202, the data is analyzed to determine if there is sufficient motion for use of the NUC algorithms without dither. If so, in Step 204, any one of the various NUC algorithms are applied. Step 205 is an offset correction step, and Step 207 is a gain correction step. Local processing may be performed during the offset correction.

If there is no scene motion, the correction process may be suspended. For some systems, an adaptive approach could be used, with dithering when there is no motion and no dithering when there is motion.

NUC Algorithms

As stated above, U.S. Pat. No. 5,925,880 describes variations of non-uniformity compensation algorithms, which can be used for the NUC algorithms of the present invention. This type of algorithm is further described in U.S. Pat. Ser. No. 09/347,242, entitled "Improved Methods of Non-Uniformity Compensation for Infrared Detector Arrays". Those description are in terms of dither scan processing, in which the scene is assumed to be stationary. Gain and offset errors are "smoothed" in successive iterations of the method, making the method equivalent to low pass filtering the errors.

Variations of the NUC algorithms may be applied to either one-dimensional and two-dimensional arrays. For both methods, the embodiments described herein compute local averages with values from "near neighbor" detector elements, resulting in a filter domain of a certain size. In other embodiments, local averages could be computed with a larger "neighborhood", with computations modified accordingly, to provide a larger filter domain.

In general, the NUC algorithms deemed suitable for use with the present invention recursively use both spatial and temporal information from near neighbors to calculate correction values. They are equivalent to spatial low pass filters. Their spatial processing involves use of adjacent detector elements. Their temporal processing involves use of previous image frames.

The basic NUC algorithm is a bi-directional orthogonal one-dimensional algorithm. It is b-directional in the sense that for each detector element's correction, values from its neighbors in two directions are used. For example, the neighbors could be left and right or upper and lower neighbors. The algorithm is orthogonal in the sense that the directions are perpendicular. For example, left and right are perpendicular to upper and lower. In the same sense, diagonal neighbors could be bi-directional and orthogonal to a particular detector element, i.e., its NE, NW, SE, and SW neighbors. The simplest forms of the algorithm use two fields of data, although more complex forms of the algorithm may use additional fields.

Non-Uniformity Compensation for One-Dimensional Arrays

Figure 3A:
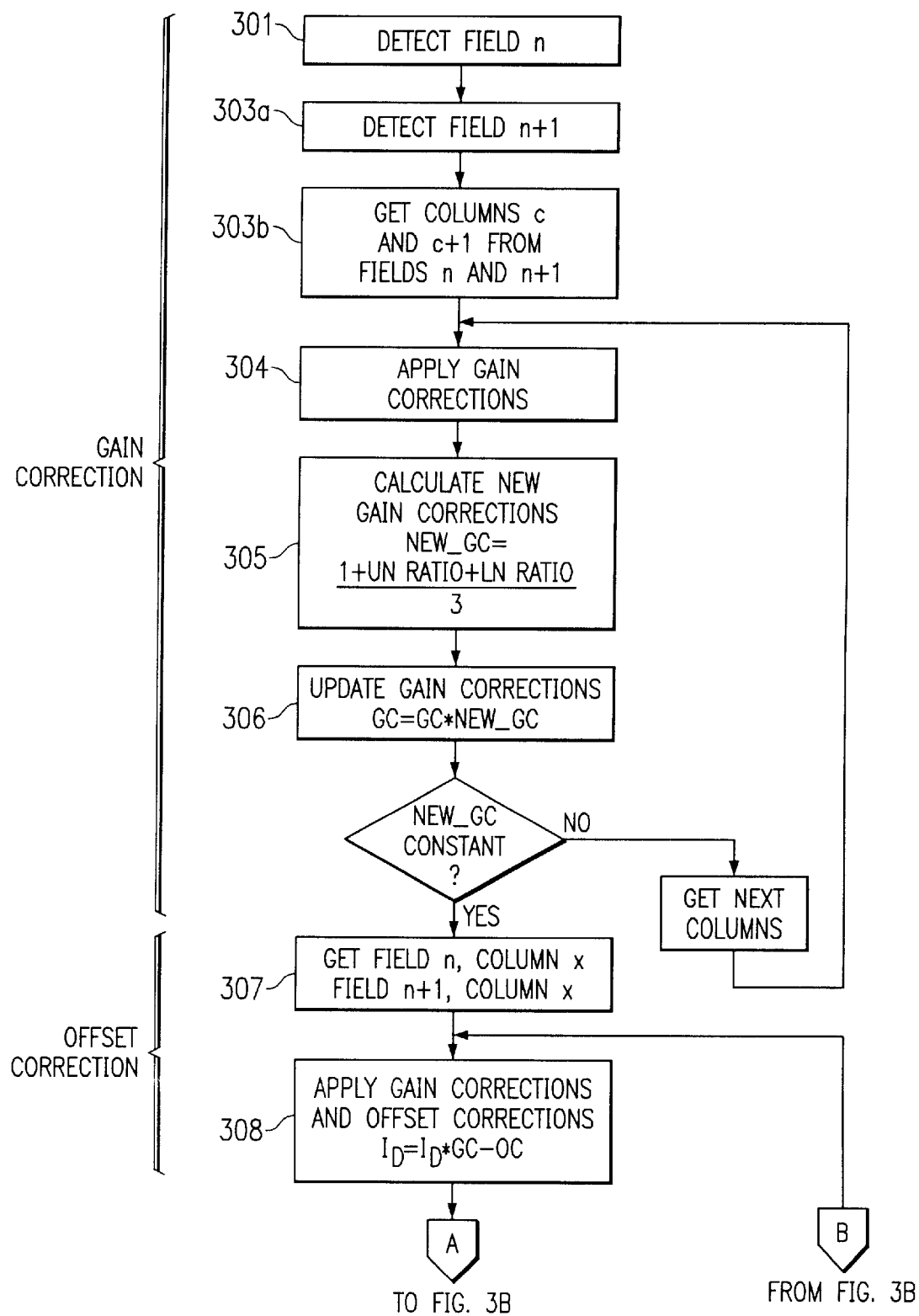
FIGS. 3A and 3B illustrate the basic steps of the method of the invention, as applied to a one-dimensional array.
Figure 3B:
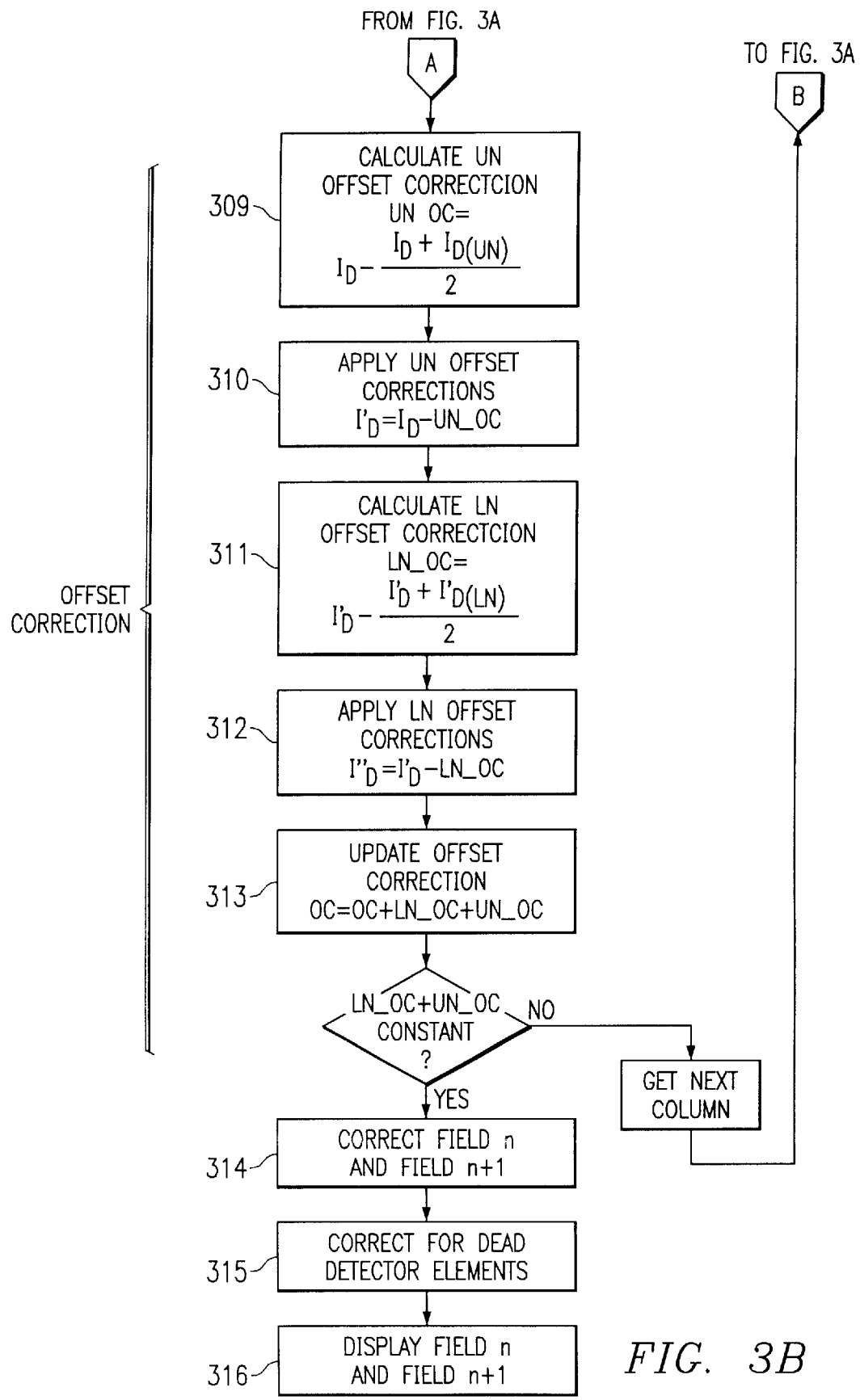

FIGS. 3A and 3B illustrates the basic steps of the non-uniformity compensation method, as applied to a one-dimensional array. The embodiment of FIGS. 3A and 3B is for a horizontally scanning array, such as array 11A of FIG. 1A, most of whose detector elements have an "upper" and a "lower" neighboring detector element. The exceptions are the "end" detector elements, for which calculations are modified. The embodiment of FIGS. 3A and 3B could be adapted for a vertically scanning array, whose detector elements would have a "left" and a "right" neighboring detector element. In the case of either a horizontally or vertically scanning array, the method involves two "near neighbors" of each detector element that is not an end detector element, regardless of whether these near neighbors are "left and right" or "upper and lower" neighbors.

In the embodiment of FIGS. 3A and 3B, a horizontally scanning array, such as array 11A receives data column-by-column. Both gain and offset corrections are also performed column-by-column, consistent with real time data acquisition and processing. Gain correction calculations are performed with data from two adjacent columns of two consecutive fields. Offset correction calculations are performed with data from the same column from two consecutive fields. For a vertically scanning array, the processing would be equivalently performed on horizontal "rows" of data from left and right neighbors.

The calculation of gain and offset correction values is not necessarily synchronous with display of the image. In the example of FIGS. 3A and 3B, the iterations for gain correction values are repeated until they are constant, then the iterations for offset correction values are repeated until they are constant, before the image is corrected and displayed. Thus, pixel data is received and stored and the method of FIGS. 3A and 3B is performed, before the data is corrected for display. Alternatively, uncorrected data and partially corrected data may be displayed as the iterations of FIGS. 3A and 3B are being performed. Also, the data may be output for further processing or storage in memory. The decision of when to use the correction values to generate a display is a matter of time or memory constraints, or of the overall system configuration.

Steps 301–306 are the gain correction part of the method. A gain correction value for each detector element is calculated before the offset correction values. This is because the offset errors do not affect the gain calculation.

Step 301 is receiving the data for a first field. A field is a set of data, acquired during a complete horizontal scan of array 11. Thus, one field contains the pixel values representing a complete scene.

Figure 4A:
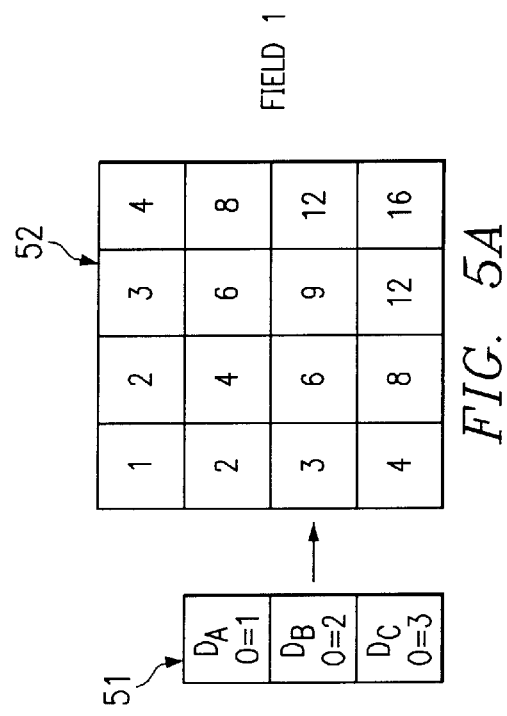
FIGS. 4A and 4B illustrate a one dimensional array with gain errors and its relative motion.

FIG. 4A illustrates Step 301 in simplified form, using a horizontally scanning array 41 and scene 42.
For simplicity of explanation, array 41 has only three detector elements, $D_{A-C}$, and scene 42 has only 4×4 locations to be represented as pixel values. Each location of scene 42 has a "true" flux value, ranging from 1 to 16. The gains of the three detector elements, $D_A$, $D_B$, and $D_C$, are 1, 2, and 3, respectively. As array 41 scans the first field (i.e., Field 1), it provides pixel values, column-by-column. With the detector element gains, the received pixel values (detector outputs) of Field 1 are:

$$\text{Field 1} = \begin{matrix} 2 & 4 & 6 & 8 \\ 6 & 12 & 18 & 24 \\ 12 & 24 & 36 & 48 \end{matrix}$$

As explained below, the detector outputs may also have offset errors, which, for simplicity of explanation, are not included in the above values.

Figure 4B:
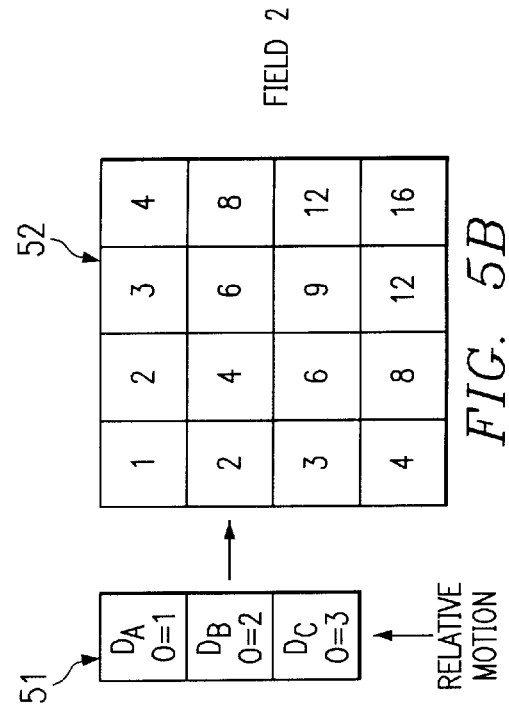

Step 303a is receiving a second field, here Field 2, with relative motion between the detector and array 41 as illustrated in FIG. 4B. For simplicity of example, the motion is the distance of one detector element, but it should be understood that the motion may be random or induced.

With the detector element gains, the received pixel values for Field 2 are:

$$\text{Field 2} = \begin{matrix} 1 & 2 & 3 & 4 \\ 4 & 8 & 12 & 16 \\ 9 & 18 & 27 & 36 \end{matrix}$$

Like the values of Field 1, these values do not include offset errors.

Step 303b is retrieving two adjacent columns of data from each field. As an alternative to Steps 303a and 303b, the process could be performed "on the fly" with pairs of columns of data being processed from Field 2 as the field is being scanned. Also, the columns whose data is being used for calculations could be spaced rather than adjacent.

Step 304 is applying the gain correction values from the previous iteration, if any, to the data for the two columns of the new field (Field 2) and the corresponding data in the previous field (Field 1). By "corresponding" is meant the pixel values in the same two columns. In the first iteration, there are no previously calculated correction values, but in subsequent iterations, each value will be multiplied by an associated gain correction value. By "associated" is meant that the pixel value is corrected with a correction value of the detector element that sensed that pixel value. After Step 304, the data for the current two columns of both fields is now gain-corrected with current gain correction values, although it may still contain offset errors.

Step 305 is calculating a new gain correction for each detector element. In general terms, this calculation involves a computation of a "gain ratio" for each detector element. Then, for each detector element, the gain ratios of that detector element and of its two neighbors are averaged.

In mathematical terms, Step 305 is performed by computing, for each detector element, a gain correction value from its UN (upper neighbor) gain ratio and its LN (lower neighbor) gain ratio. The general form of the gain correction (GC) computation is:

$$NEW\_GC = \frac{(1 + UN \text{ gain ratio} + LN \text{ gain ratio})}{3}$$

This calculation is an average of contributing gain ratios. The detector element whose gain correction value is being calculated contributes a term, as do its two near neighbors. The unity term is equivalent to a gain ratio of 1/1, so that the detector element's own gain is used to determine the average. The quotient, 3, is the number of contributing detector elements (the detector element under consideration and its upper and lower neighbors).

Using the data of FIGS. 4A and 4B as a specific example, to begin Step 305, differencing the received pixel values in the first two columns of Field 1 generates the following data:

$$\text{Col } 2 - \text{Col } 1 = \Delta 1 = \begin{matrix} 2 \\ 6 \\ 12 \end{matrix}$$

Differencing the received pixel values in the first two columns of Field 2 generates the following data:

$$\text{Col } 2 - \text{Col } 1 = \Delta 2 = \begin{matrix} 1 \\ 4 \\ 9 \end{matrix}$$

Each difference value is "associated" with a detector element, in the sense that the same detector element detected the two pixel values, from which the difference value was calculated.

The difference values from Fields 1 and 2 are used to obtain gain ratios. These ratios compare difference values of neighboring detector elements. For each detector element, an upper neighbor (UN) gain ratio and a lower neighbor (LN) gain ratio are computed. The following table illustrates how these gain ratios are calculated:

| Δ1 | Δ2 | Δ1/Δ2 | Δ2/Δ1 |
|----|----|----|----|
|    | 1  | —  |    |
| 2  | 4  | 2/4 | 4/2 |
| 6  | 9  | 6/9 | 9/6 |
| 12 |    | —  |    |

Each Δ1/Δ2 value is a UN gain ratio—the difference value associated with a detector element's UN divided by the difference value associated with that detector element. Each Δ2/Δ1 value is a LN gain ratio—the difference value associated with a detector element's lower neighbor divided by the difference value associated with that detector element.

As an example of calculating these ratios, in Field 2, $D_B$ sensed pixel values with a difference value of 4. In Field 1, $D_B$'s upper neighbor, $D_A$, sensed pixel values in the same locations but with a difference value of 2. Thus, the UN gain ratio for $D_B$ is 2/4.

As indicated, because $D_A$ has no upper neighbor, no UN gain ratio is available for $D_A$. Also, because $D_C$ has no lower neighbor, $D_C$ has no LN gain ratio.

As an example, for detector element $D_B$, the gain correction is calculated as:

$$GC_B = \frac{(1 + 2/4 + 9/6)}{3}$$
$$= 1$$

, where 2/4 is $D_B$'s UN gain ratio and 9/6 is $D_B$'s LN gain ratio.

If a detector element is an "end" detector element, it has either no UN or no LN. In this case, when calculating the gain correction value, there are only two contributing detector elements. For example, for the "end" detector element, $D_A$, which has no upper neighbor, the gain correction is calculated as:

$$GC_A = \frac{(1 + 4/2)}{2}$$
$$= 1.5$$

, where 4/2 is $D_A$'s LN gain ratio. Likewise, for the other end detector element, $D_C$, which has no lower neighbor, the gain correction is calculated as:

$$GC_C = \frac{(1 + 6/9)}{2}$$
$$= .833$$

, where 6/9 is $D_C$'s UN gain ratio.

The following table sets out the gain correction values obtained as a result of Step 305, based on the first two columns of Fields 1 and 2. Each detector element has an associated gain correction value. In the next iteration of Step 304, these values will be used to correct the next column of data.

$$GC_A = 1.5$$
$$GC_B = 1$$
$$GC_C = .833$$

In Step 306, the gain correction values are updated. This is accomplished by multiplying the old gain correction values GC (i.e. those updated from the previous iteration) and the gain correction values NEW_GC computed in Step 305.

Steps 303b through 306 are repeated for successive pairs of columns of data across the detector array. As stated above, the column pairs can be adjacent to each other or spaced. The next iteration can re-use one column or use two new columns. The iterations are repeated until the calculated gain correction values become substantially constant.

Steps 307–316 are the offset correction part of the non-uniformity compensation method. The offset correction is performed in two parts.

It is assumed that data for at least two fields is stored in memory as a result of the gain correction calculations. Continuing the example above, data for Field 1 and Field 2 is available. In Step 307, two corresponding columns are retrieved for offset correction calculations.

Figure 5A:
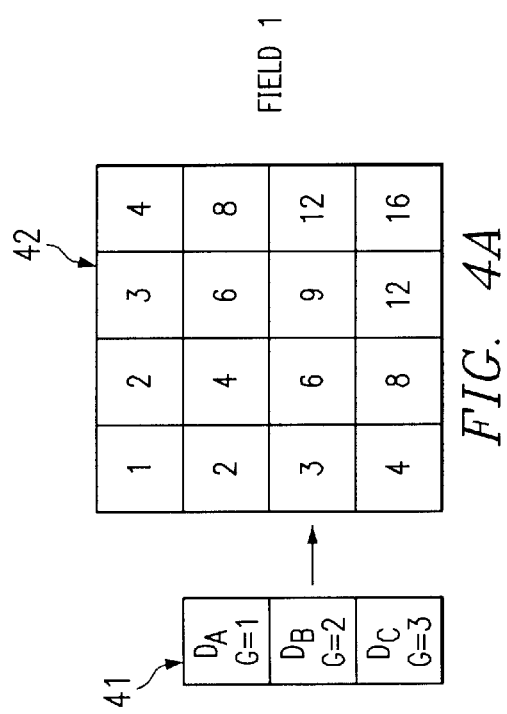
FIGS. 5A and 5B illustrate a one dimensional array with offset errors and its relative motion.
Figure 5B:
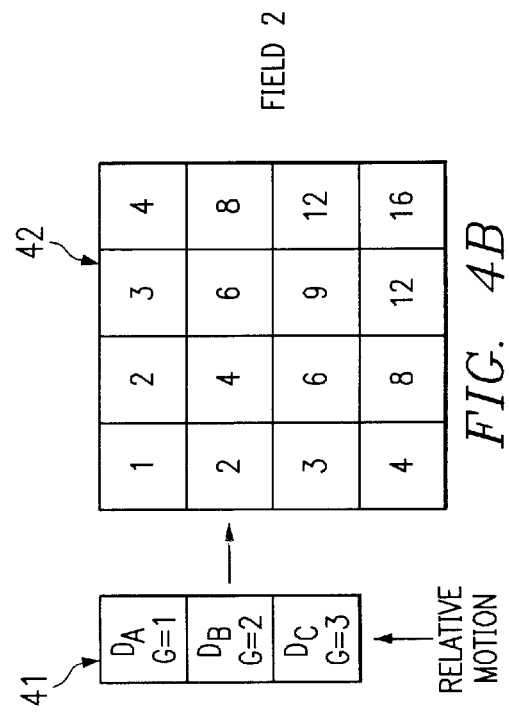

FIGS. 5A and 5B illustrate the same scene as illustrated in FIGS. 4A and 4B, but with the detector elements having offset errors rather than gain errors. As in FIGS. 4A and 4B, the scene is assumed to be stable, so the flux values are illustrated as being the same from field-to-field. Each detector element is assumed to have an offset error, with detector elements $D_A$, $D_B$, and $D_C$ having offset values of 1, 2, and 3, respectively. Thus, for the first column of Field 1, the received pixel values are:

3
5
7

, where each value is the sum of the "true" pixel value and the offset error of the detector element that sensed it. For the first column of Field 2, the received pixel values are:

2

4

6

In Step 308, the updated gain correction values from Step 306 and the updated offset correction values calculated in the previous iteration, if any, are applied to the pixel values for the new column in both the new field and the previous field. In the first iteration of Step 308, there are no previously computed offset corrections. In the next iteration of Step 308, previously computed offset correction values will be available, and will be used to correct the new column of data in both Field 1 and Field 2.

In Step 309, offset correction values for each detector element are calculated, using the difference of the output of that detector element and of its upper neighbor. These offset correction values are referred to herein as "upper neighbor offset correction values". This calculation first determines, for each detector element, the difference between the output of a detector element and the output of the detector element's upper neighbor, at the same location of the scene. Using the received values set out above, and assuming the gain correction from Step 308, the UN difference values are:

$$- = -$$
$$4 - 3 = 1$$
$$6 - 5 = 1$$

As indicated, detector element $D_A$ has no upper neighbor and thus has no UN difference value. Next, for each detector element, its difference value is divided by 2 (the number of contributing detector elements). Expressed in mathematical form, each upper neighbor (UN) offset correction (OC) value is calculated as:

$$UN\ OC = \frac{UN\ \text{difference}}{2}$$

The above offset correction value could be equivalently expressed as a detector element's local average output, subtracted from that detector element's output. For example, for $D_B$:

$$OC_B = I_B - \frac{1}{2}(I_B + I_A)$$
$$= \frac{1}{2}(I_B - I_A)$$

, where I represents a detector element's output. For the first iteration, the UN offset correction values are:

$$OC_A = -$$
$$OC_B = \frac{1}{2} = 0.5$$
$$OC_C = \frac{1}{2} = 0.5$$

In Step 310, the UN offset correction values calculated in Step 309 are applied to the output values for the current column in both the new field and the previous field. Thus, for Field 1 (the previous field), the corrected outputs are:

$$3 - 0 = 3$$
$$5 - 0.5 = 4.5$$
$$7 - 0.5 = 6.5$$

, and for Field 2 (the new field), the corrected outputs are:

$$2 - 0 = 2$$
$$4 - 0.5 = 3.5$$
$$6 - 0.5 = 6.5$$

In Step 311, an offset correction value for each detector element is calculated from the corrected data of Step 310, using the difference of the output of that detector element and its lower neighbor. These offset correction values are referred to herein as "lower neighbor offset correction values". The upper and lower neighbors are referred to herein as "opposing" neighbors.

The lower neighbor offset correction calculation determines, for each detector element, the difference between the corrected output of a detector element and the corrected output of that detector element's lower neighbor, at the same scene location. The resulting difference values are:

$$3 - 3.5 = -0.5$$
$$4.5 - 5.5 = -1$$
$$- = -$$

As indicated, detector element $D_C$ has no lower neighbor and thus has no LN difference value. Next, for each detector element, its difference value is divided by 2 (the number of contributing detector elements). Expressed in mathematical form, each lower neighbor (LN) offset correction (OC) value is calculated as:

$$LN\ OC = \frac{LN\ \text{difference}}{2}$$

Like the UN offset correction value calculation, the above LN offset correction value calculation can be equivalently expressed as the local average of a detector element and its lower neighbor, subtracted from that detector element's output. For example, for $D_B$:

$$OC_B = I_B - \frac{1}{2}(I_B + I_C)$$
$$= \frac{1}{2}(I_B - I_C)$$

, where I represents a detector element's output.
Thus, the LN offset correction values are:

$$OC_A = -(0.5)/2 = -0.25$$
$$OC_B = -\frac{1}{2} = -0.5$$

-continued $$OC_C = -$$

In Step 312, these offset correction values are applied to the current column of data in both the previous field and the current field.

In Step 313, the offset correction values are updated by adding to the old offset correction (i.e., that of the previous iteration) the UN offset correction value calculated in Step 309 and the LN offset correction value calculated in Step 311.

Steps 307–313 are repeated, column by column, until the offset correction values are substantially constant. The successive columns can be adjacent or spaced.

In Step 314, the gain and offset correction values are now used to correct the data in Field n and Field n+1 for display.

Step 315 is correcting for "dead" detector elements, which are those that do not detect a signal or can otherwise be known to be defective. A pixel value sensed by another detector element in an adjacent field can be substituted for the pixel value that should have been detected by the dead detector element. For example, if $D_A$ were dead, the pixel value detected by its lower neighbor $D_B$ in Field 2 can be substituted for the same pixel in Field 1.

The data for the current column has now been both gain corrected and offset corrected and is now ready for display. In Step 316, Fields n and n+1 are displayed.

Non-Uniformity Compensation for Two-Dimensional Arrays

In the case of a two-dimensional array, most of its detector elements have adjoining (i.e. "near") neighbors on all four sides. The exceptions are the detector elements on the first and last columns and the first and last rows. These "end" detector elements have only three neighbors, and in the case of corner detector elements, they have only two neighbors. Also, each detector element has other detector elements that touch at its corners and that can also be considered neighbors. As explained below, for a two-dimensional array, gain correction calculations use local averages of gain ratios of each detector element and its four adjoining neighbors, whereas offset correction calculations use local averages of outputs of each detector element and of its four adjoining neighbors and of two of its corner neighbors.

Figure 6A:
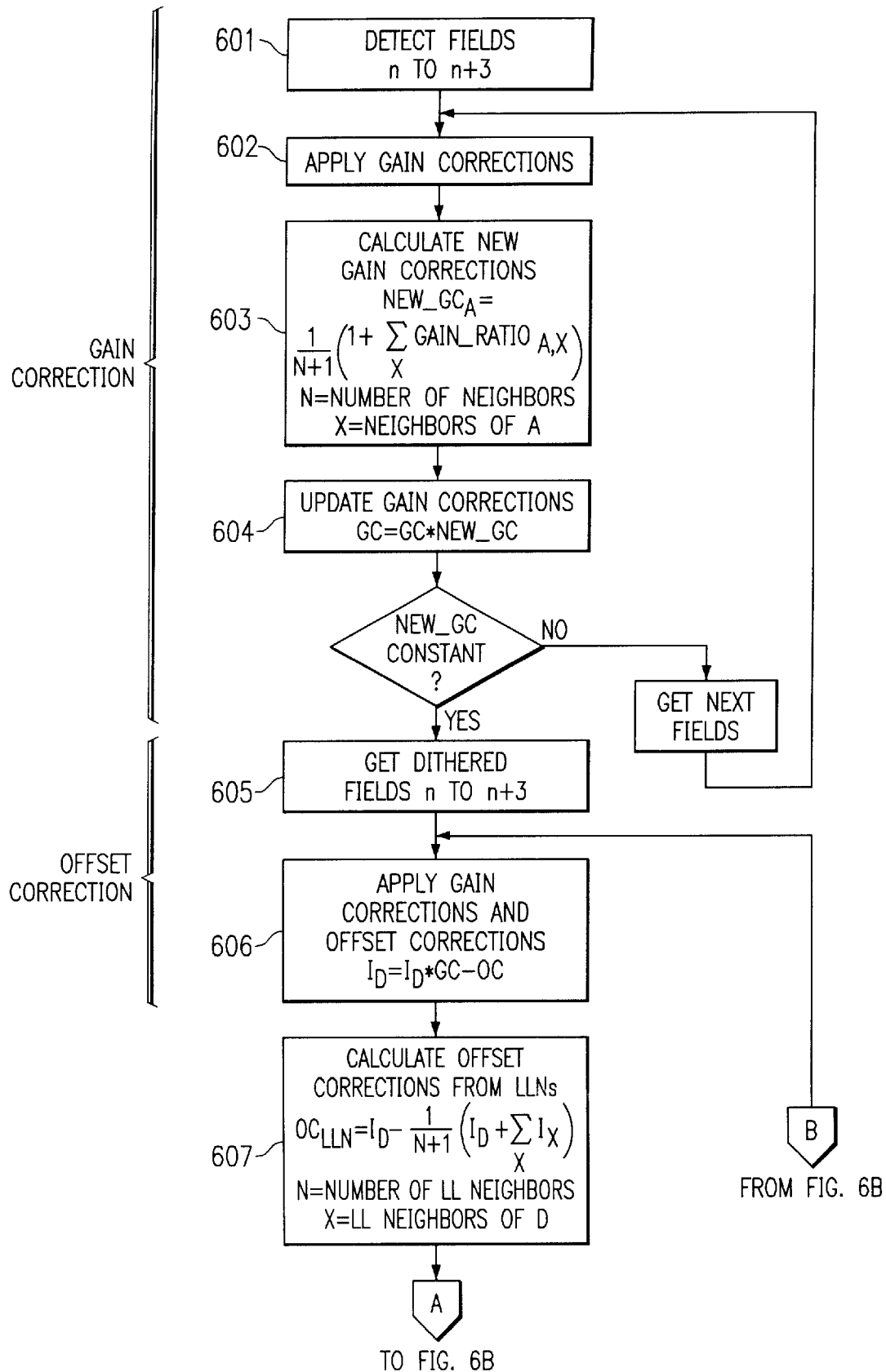
FIGS. 6A and 6B illustrate the basic steps of the method of the invention, as applied to a two-dimensional array.
Figure 6B:
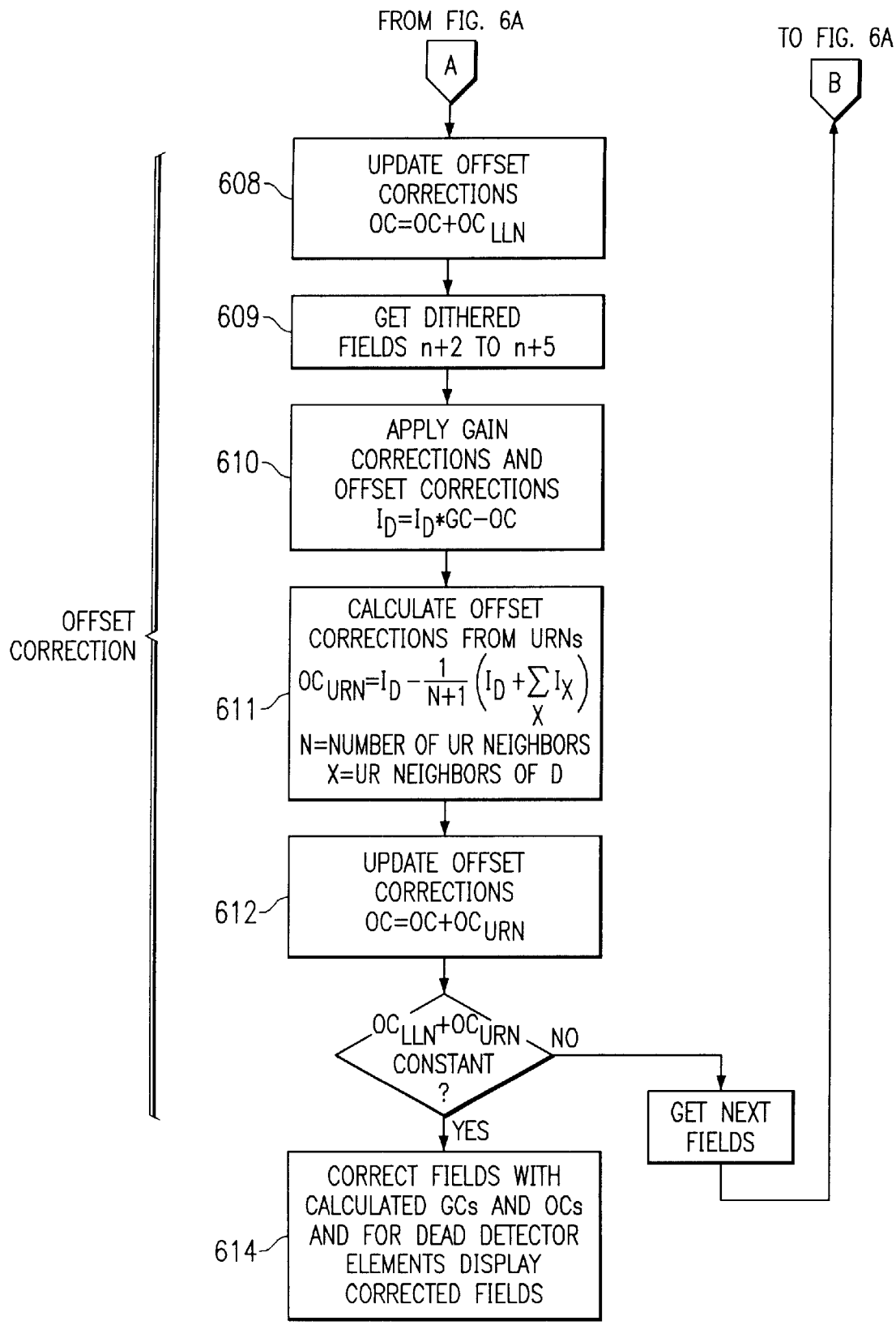

FIGS. 6A and 6B illustrate the basic steps of the method, as applied to a two-dimensional array. As indicated below, both gain correction and offset correction require data from a number of time-contiguous fields. Gain correction uses data from four fields and offset correction uses data from six fields.

Steps 601–604 are the gain correction part of the method. Step 601 is receiving four successive fields of pixel values.

Step 602 is correcting the pixel values for the four fields with gain correction values calculated in the previous iteration. In the first iteration, there are no previously calculated values, and the initial gain correction value is 1.

Step 603 is calculating a new gain correction for each detector element. In general, this calculation first involves a computation of a gain ratio for each detector element. Then, for each detector element, the gain ratios of that detector element and of its four neighbors are averaged.

Figure 7:
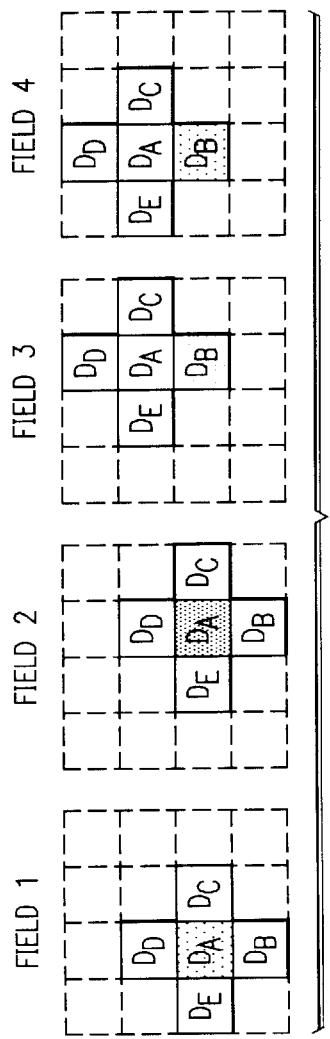
FIG. 7 illustrates a detector element and its neighbors for purposes of gain correction for a two-dimensional array.
Figure 8:
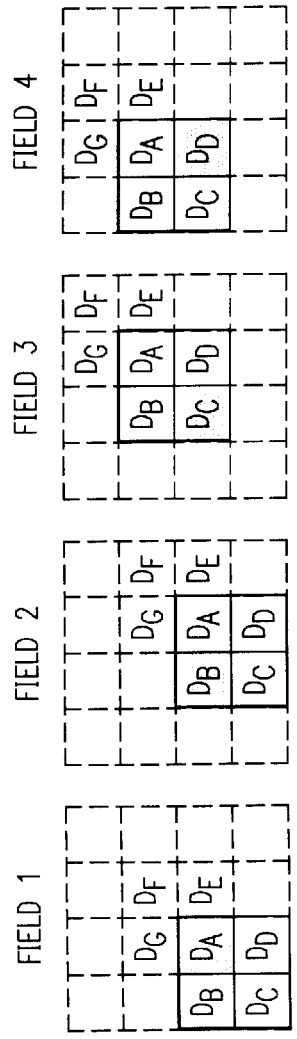
FIG. 8 illustrates a detector element and its neighbors for purposes of offset correction for a two-dimensional array.

FIG. 8 illustrates $D_A$ with its four neighbors, $D_B$, $D_C$, $D_D$, and $D_E$, during each of the four fields of FIG. 7. As in the case of the above description of the one-dimensional array, the motion is illustrated as the distance of one detector element for purposes of example only. Typically, the motion is random motion of the platform on the scene. In Field$_1$, $D_A$ detects the flux value, $\Phi(x,y)$. In Field$_2$, $D_A$ has moved one space to the right and detects the flux value $\Phi(x+1, y)$. In Field$_3$, $D_B$ is now in position to detect the flux value $\Phi(x+1,y)$. Finally, in Field$_4$, $D_B$ detects the flux value $\Phi(x,y)$.

The following table sets out the responses of FIG. 8, where G is the gain and O is the offset for a detector element:

| Field | $D_A$ | $D_B$ |
|---|---|---|
| 1 | $G_A \cdot \Phi(x,y) + O_A$ | |
| 2 | $G_A \cdot \Phi(x+1,y) + O_A$ | |
| 3 | | $G_B \cdot \Phi(x+1,y) + O_B$ |
| 4 | | $G_B \cdot \Phi(x,y) + O_B$ |

For each detector element, the difference between two adjacent flux values detected by that detector element is calculated. For $D_A$, the difference value is:

$$\Delta_A = (G_A \Phi(x,y) + O_A - G_A \Phi(x+1,y) + O_A$$

, and for $D_B$, the difference value is:

$$\Delta_B = (G_B \Phi(x+1,y) + O_B - G_B \Phi(x,y) + O_B$$

The gain ratio between detector elements $D_A$ and $D_B$ is:

$$gain\_ratio_{A,B} = -gradient\_ratio_{A,B}$$

$$= -\frac{\Delta_B}{\Delta_A}$$

$$= -\frac{(G_B \cdot \Phi(x+1, y) + O_B) - (G_B \cdot \Phi(x, y) + O_B)}{(G_A \cdot \Phi(x, y) + O_A) - (G_A \cdot \Phi(x+1, y) + O_A)}$$

$$= \frac{G_B}{G_A}$$

Similar gain ratios can be calculated for any pair of neighboring detector elements.

The gain correction for $D_A$ is derived from the gain ratios of $D_A$ and of its four neighbors. In mathematical terms, the gain correction for $D_A$ is described by:

$$GC_A = \frac{1}{5}\left(1 - \sum_{x=B,C,D,E} gradient\_ratio_{A,X}\right)$$

$$= \frac{1}{5}\left(1 - \frac{\Delta_B}{\Delta_A} - \frac{\Delta_C}{\Delta_A} - \frac{\Delta_D}{\Delta_A} - \frac{\Delta_E}{\Delta_A}\right)$$

$$= \frac{1}{5}\left(1 + \frac{G_B}{G_A} + \frac{G_C}{G_A} + \frac{G_D}{G_A} + \frac{G_E}{G_A}\right)$$

$$= \frac{\frac{1}{5}\sum_{X=A,B,C,D,E} Gain_X}{Gain_A}$$

Similar calculations can be made to obtain a gain correction value for each detector element.

Step 604 is updating the gain correction values by multiplying the newly calculated gain correction values and the old gain correction values. If each detector element's output were multiplied by its gain correction, the result would be a corrected output value. For example, after Step 604, $D_A$'s pixel value is:

$$\text{Corrected } I_A = GC_A(\text{Gain}_A \cdot \Phi + \text{Offset}_A)$$

$$= \frac{1}{5}\left(\sum_{X=A,B,C,D,E} \text{Gain}_X\right) \cdot \Phi + GC_A \cdot \text{Offset}_A$$

$$= \text{Residual Gain}_A \cdot \Phi + \text{New Offset}_A$$

Using matrix notation, the gain correction calculations can be described in terms of the entire array. The scene flux collected by the array during a four-field cycle can be depicted as $[\Phi]$, $[\Phi]\rightarrow$, $[\Phi]\rightarrow\uparrow$, and $[\Phi]\uparrow$, where were each arrow indicates the scene location relative to the initial location. The responses of the detector elements during the cycle are represented by four image matrices: $[I_{Field\ 1}]$, $[I_{Field\ 2}]$, $[I_{Field\ 3}]$, and $[I_{Field\ 4}]$.
Thus:

$$[I_{Field\ 1}] = [\text{Gain}] \cdot [\Phi] + [\text{Offset}]$$

$$[I_{Field\ 2}] = [\text{Gain}] \cdot [\Phi] \rightarrow + [\text{Offset}]$$

$$[I_{Field\ 3}] = [\text{Gain}] \cdot [\Phi] \rightarrow \uparrow + [\text{Offset}]$$

$$[I_{Field\ 4}] = [\text{Gain}] \cdot [\Phi] \uparrow + [\text{Offset}].$$

The difference values for Fields 1 and 2 are calculated as:

$$[I_{Field\ 1}] - [I_{Field\ 2}] = [\text{Gain}] \cdot ([\Phi] - [\Phi] \rightarrow)$$

, and the shifted image difference values for Fields 3 and 4 are:

$$([I_{Field\ 4}] - [I_{Field\ 3}]) = ([\text{Gain}] \cdot ([\Phi]\uparrow - [\Phi]\rightarrow\uparrow))$$

, which is equivalent to:

$$[I_{Field\ 4}] - [I_{Field\ 3}] = [\text{Gain}] \cdot ([\Phi] - [\Phi]\rightarrow)$$

This operation is the same as that used to obtain $\Delta_A$ and $\Delta_B$, as described above for detector elements $D_A$ and $D_B$.

From the above difference and shifted difference equations, the gain ratios between neighboring detector elements can be calculated as:

$$\frac{[I_{Field\ 4}]\downarrow - [I_{Field\ 3}]\downarrow}{[I_{Field\ 1}] - [I_{Field\ 2}]} = \frac{[\text{Gain}]\downarrow}{[\text{Gain}]}$$

, which is the same calculation described above for obtaining gain ratio$_{A,B}$.
The gain ratios for other pairs of detector elements are:

$$\frac{[I_{Field\ 1}]\rightarrow - [I_{Field\ 4}]\rightarrow}{[I_{Field\ 2}] - [I_{Field\ 3}]} = \frac{[\text{Gain}]\rightarrow}{[\text{Gain}]}$$

$$\frac{[I_{Field\ 2}]\uparrow - [I_{Field\ 1}]\uparrow}{[I_{Field\ 3}] - [I_{Field\ 4}]} = \frac{[\text{Gain}]\uparrow}{[\text{Gain}]}$$

$$\frac{[I_{Field\ 3}]\leftarrow - [I_{Field\ 2}]\leftarrow}{[I_{Field\ 4}] - [I_{Field\ 1}]} = \frac{[\text{Gain}]\leftarrow}{[\text{Gain}]}$$

The gain correction may be defined as the averaged sum of the gain ratios:

$$[GC] = \frac{1}{5}\left(1 + \frac{[\text{Gain}]\downarrow}{[\text{Gain}]} + \frac{[\text{Gain}]\rightarrow}{[\text{Gain}]} + \frac{[\text{Gain}]\uparrow}{[\text{Gain}]} + \frac{[\text{Gain}]\leftarrow}{[\text{Gain}]}\right)$$

$$= \left(\frac{1}{5}\begin{bmatrix} 0 & 1 & 0 \\ 1 & 1 & 1 \\ 0 & 1 & 0 \end{bmatrix} * [\text{Gain}]\right) \cdot \frac{1}{[\text{Gain}]}$$

, The convolution operation on the [Gain] matrix (in braces) represents the shifted, summed, and averaged [Gain] matrix. The operation of convolution with the diamond-shaped mask results in a spatially smoothed (two-dimensionally filtered) version of the [Gain] matrix.

For end detector elements, including those at the corners, the calculations are modified. In a manner analogous to calculating gain corrections for the end detector elements of a one-dimensional array, only the values of available neighbors are part of the local average.

Steps 601–604 are repeated, using successive sets of four fields of data, until the gain correction values become substantially constant.

Referring again to FIGS. 6A and 6B, after the gain correction values are calculated, Steps 605–612 are performed for offset correction values. For each detector element, two additional neighbors are used, as compared to those used for gain correction.

FIG. 8 illustrates the neighbor detector elements used to estimate the offset correction for $D_A$. As indicated, $D_A$ has three lower left neighbors (LLNs), which are $D_B$, $D_C$, and $D_D$, and three upper right neighbors (URNs), which are $D_E$, $D_F$, and $D_G$. Although the following description is in terms of these sets of neighboring detector elements, it should be understood that the method could be modified so as to use upper left neighbors and lower right neighbors. In both cases, the two sets of neighboring detector elements are in opposing corners, and are referred to herein as "opposing" sets of neighbors. Also, the method could be modified so that the two sets of neighboring detector elements are comprised of some number of detector elements other than three.

Referring to FIGS. 6A and 6B and to FIG. 8, offset correction is performed in two parts. First, in Step 605, the offset correction for each detector element is calculated with pixel values from the detector element and its LLNS. This data is in Field$_n$ through Field$_{n+3}$. If these offset correction values were applied, the result would be a residual offset error for each detector element. These residual offset errors are further corrected with pixel values from the detector element and its URNs. This data is in Field$_{n+2}$ through Field$_{n+5}$.

In Step 606, the data to be used for offset correction calculations is corrected with the previously calculated gain correction values and with any previously calculated offset correction values.

In Step 607, the offset corrections from the LLNs are calculated. These offset corrections are referred to herein as "LLN offset corrections". For $D_A$, the calculation is as follows:

$$OC_A = I_A(n) - \frac{1}{4}(I_A(n) + I_B(n+1) + I_C(n+2) + I_D(n+3))$$

$$= \frac{3}{4}\left[I_A(n) - \frac{1}{3}(I_B(n+1) + I_C(n+2) + I_D(n+3))\right]$$

, where $$I_A(n) = g \cdot \Phi(x, y) + O_A$$

$$I_B(n+1) = g \cdot \Phi(x, y) + O_B$$

$$I_C(n+2) = g \cdot \Phi(x, y) + O_C$$

$$I_D(n+3) = g \cdot \Phi(x, y) + O_D$$

By substitution, $$OC_A = O_A - \frac{1}{4}(O_A + O_B + O_C + O_D)$$

$$= O_A - \frac{1}{4} \sum_{X=A,B,C,D} O_X$$

The offset correction is updated in Step 608 by adding it to any previously calculated offset correction. As an example of the corrected data at this point, if $D_A$'s response were corrected by subtracting its offset correction, $D_A$'s corrected response would be:

$$\text{Corrected } I_A = g \cdot \Phi(x, y) + O_A - OC_A$$

$$= g \cdot \Phi(x, y) + \frac{1}{4} \sum_{X=A,B,C,D} O_x$$

At this point, $D_A$ has a residual offset, which is the spatial average of offsets from $D_A$ and its LLNs, $D_B$, $D_C$, $D_D$. Similar calculations are made for each detector element.

Using matrix notation, the offset correction can be described in terms of the entire array. At the end of the cycle, four image fields are received and are shifted as:

$$[I_{Field1}] = g \cdot [\Phi] + [Offset]$$
$$[I_{Field2}] \leftarrow = g \cdot [\Phi] + [Offset] \leftarrow$$
$$[I_{Field3}] \leftarrow \downarrow = g \cdot [\Phi] + [Offset] \leftarrow \downarrow$$
$$[I_{Field4}] \downarrow = g \cdot [\Phi] + [Offset] \downarrow$$

The LLN offset correction is defined as:

$$[OC_{LLN}] = [I_{Field1}] - \frac{1}{4} \cdot ([I_{Field1}] + [I_{Field2}] \leftarrow +$$
$$[I_{Field3}] \leftarrow \downarrow + [I_{Field4}] \downarrow)$$

$$= [Offset] - \frac{1}{4} \cdot ([Offset] + [Offset] + [Offset] \leftarrow +$$
$$[Offset] \leftarrow \downarrow + [Offsest] \downarrow)$$

$$= [Offset] - \frac{1}{4} \cdot \begin{bmatrix} 1 & 1 \\ 1 & 1 \end{bmatrix} * [Offset]$$

When subtracting the offset correction term from the image, the residual offset becomes:

$$\begin{bmatrix} Residual \\ Offset \end{bmatrix} = \frac{1}{4} \begin{bmatrix} 1 & 1 \\ 1 & 1 \end{bmatrix} * [Offset]$$

Mathematically, the smoothing of offset errors is the same as convolving the offset matrix with a rectangular mask. Recursively applying offset corrections to the images is like a low pass filtering process to the offset noise, which will eventually smooth out the high frequency components of the [Offset] matrix.

In Steps 609–612, $D_A$ is grouped with its URNs, $D_E$, $D_F$, and $D_G$, to calculate its URN offset correction. Referring to the table above, these detector elements receive the scene flux value (x+1,y−1) in Field$_{n+2}$ through Field$_{n+5}$. These are the four fields retrieved in Step 609. The output values in these fields are corrected in Step 610 with current gain and offset correction values. In Step 611, an analogous calculation as described above for LLNs can be used for URNs, where the offset correction for $D_A$ is calculated by averaging the offset error of $D_A$ with those of $D_E$, $D_F$, and $D_G$. The offset correction values are again updated in Step 612.

Steps 605–612 are repeated for every four successive fields, alternating the LLN and URN corrections. The alternating corrections ensure that end detector elements are corrected at least once by at least one neighbor.

As explained above, a weighting factor can be applied to the correction value during the offset correction loops. A weighting factor, alpha <1, is applied such that only fractions of the calculated offset errors are corrected.

Offset corrections can be calculated with different combinations of neighboring detector elements. For example, fields 1 and 2 could be used to correct offset errors using left neighbors, followed by right neighbors. Then, fields 2 and 3 could be used to correct offset errors using down neighbors, followed by up neighbors, etc.

Recursive Operation

The process of FIG. 3 (for one dimensional arrays) and FIG. 6 (for two dimensional arrays) may be performed over many iterations. Gain corrections are recursively applied to each new image, with each iteration reducing the gain differences among detector elements. Likewise, the recursive application of offset corrections to each new image reduces the offset differences among detector elements.

In practice, gain non-uniformities are not expected to be as big as offset non-uniformities, and a rather smoothed gain matrix should be obtained in a few iterations. Offset correction is anticipated to be applied continuously. Gain errors can be corrected in the beginning of an image sequence, or when there is major change in scene radiance. The residual gain errors will also be smoothed out in the offset correction loops.

Bi-Directional and One-Step Algorithms for Offset Correction

The above-described concepts incorporate an algorithm referred to herein as a "bi-directional" algorithm for offset correction. As applied to a one-dimensional array, where the scan direction is horizontal, the algorithm could be described as: calculate correction using upper neighbor averaging, apply the correction to the detector elements, calculate the correction using lower neighbor averaging, apply the correction to the detector elements. The algorithm is "bi-directional" in the sense that two neighbors are used, with a correction being calculated first in one direction then in the other. The algorithm is also "two-step" in the sense that the correction from one neighbor is applied before the correction from the other neighbor is calculated.

The bi-directional two-step algorithm of the preceding paragraph can also be described for a one-dimensional array that is scanned vertically. The algorithm would then involve left and right neighbors. In general, rows and columns are equivalent.

The same algorithm can be used for two-dimensional arrays. As an example, a first pass (or iteration) would make corrections with left and right neighbors. A second pass (or iteration) would make corrections with upper and lower neighbors. This approach requires less computation (two fields rather than four are averaged) and less memory, as compared to approaches that use four neighbors.

Two-step algorithms can be shortened into one-step algorithms. Referring again to the upper and lower neighbor corrections described above for the one-dimensional array, the offset correction value from the lower neighbor is:

$$[OC]_{LN} = \tfrac{1}{2}([I]_1 - [I]_2\downarrow) \qquad (1)$$

, where $[I]_1$ and $[I]_2$ are two fields at times t1 and t2, respectively, and represents a shift down. For generality, each set of [I] values is a "matrix", where the matrix is one-dimensional for a one-dimensional (scanning) array. Applying the $[OC]_{LN}$ to the two fields results in:

$$[I]_1' = [I]_1 - [OC]_{LN} \qquad (2)$$

$$[I]_2' = [I]_2 - [OC]_{LN} \qquad (3)$$

, where $[I]_1'$ and $[I]_2'$ are the corrected fields. The offset correction from the upper neighbor, using the corrected fields is:

$$[OC]_{UN} = \tfrac{1}{2}([I]_2' - [I]_1') \qquad (4)$$

The combined correction from both neighbors is:

$$OC_{bi\text{-}directional} = [OC]_{LN} + [OC]_{UN} \qquad (5)$$

By substitution, a one-step equation can be derived from the combined two-step equation:
Substitute (1) into (2) and (3)

$$[I]_1' = [I]_1 - \tfrac{1}{2}\cdot([I]_1 - [I]_2^{\downarrow}) = \tfrac{1}{2}\cdot[I]_1 + \tfrac{1}{2}\cdot[I]_2^{\downarrow} \qquad (6)$$

$$[I]_2' = [I]_2 - \tfrac{1}{2}\cdot([I]_1 - [I]_2^{\downarrow}) = [I]_2 - \tfrac{1}{2}\cdot[I]_1 + \tfrac{1}{2}\cdot[I]_2^{\downarrow} \qquad (7)$$

Substitute (6) and (7) into (4)

$$[OC]_{UN} = \tfrac{1}{2}\cdot\left\{\left([I_2] - \tfrac{1}{2}\cdot[I]_1 + \tfrac{1}{2}\cdot[I]_2^{\downarrow}\right) - \left(\tfrac{1}{2}\cdot[I]_1 + \tfrac{1}{2}\cdot[I]_2^{\downarrow}\right)^{\uparrow}\right\}$$

$$= \tfrac{1}{2}\cdot\left\{[I_2] - \tfrac{1}{2}\cdot[I]_1 + \tfrac{1}{2}\cdot[I]_2^{\downarrow} - \tfrac{1}{2}\cdot[I_2]_1^{\uparrow} - \tfrac{1}{2}\cdot[I_2]_1^{\uparrow}\right\} \qquad (8)$$

The bi-directional offset correction is obtained by combining (1) and (8)

$$[\Delta OC] = [OC]_{LN} + [OC]_{UN}$$

$$= \tfrac{1}{2}([I]_1 - [I]_2^{\downarrow}) + \tfrac{1}{2}\left([I]_2 - \tfrac{1}{2}\cdot[I]_1 + \tfrac{1}{2}\cdot[I]_2^{\downarrow} - \tfrac{1}{2}\cdot[I]_1^{\uparrow} - \tfrac{1}{2}\cdot[I]_2\right)$$

$$= \tfrac{1}{4}\cdot([I]_1 - [I]_1^{\uparrow} + [I]_2 - [I]_2^{\downarrow})$$

Thus, each one-step value is the mathematical equivalent of combining the two corrections (UN and LN) described above in connection with FIG. 3 and Steps 309–312. In words, each offset correction value is the sum of two "shifted image" difference, where an "image" is a matrix of detector output values. The matrix is one-dimensional for a one-dimensional (scanning) array and two-dimensional for a two-dimensional (staring) array. Each shifted image difference is the difference from two images in the same field, one shifted with respect to the other. The ¼ factor is the result of combining the ½ factor associated with each of the two field differences.

For a one-step algorithm with left and right neighbor shifting rather than upper and low shifting, each offset correction value would be calculated as:

$$[\Delta OC] = \tfrac{1}{4}\cdot([I]_1 - [I]_1^{\rightarrow} + [I]_2 - [I]_2^{\leftarrow})$$

Other Embodiments

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A ditherless method of compensating non-uniformities among detector elements of an infrared detector array that captures images of a scene, where each detector element of the array has at least one neighbor, comprising the steps of:
   determining whether there is relative motion of the at least a portion of the scene and the detector array;
   if there is relative motion, performing a non-uniformity compensation process as follows:
   receiving two sets of output values, each set representing two matrices of output data from said array, the sets being from a first field and a second field detected by the array at different times;
   applying any previously calculated offset correction values to the output values;
   for the first field, subtracting output values of neighbors in a first direction from detector element values;
   for the second field, subtracting output values of neighbors in a second direction from detector element values;
   adding the results of the two subtracting steps;
   dividing the sum by four, thereby obtaining new offset correction values;
   updating any previously calculated offset correction values with the new offset correction values; and
   repeating the above steps for a desired number of iterations.

2. The method of claim 1, wherein the first direction and the second direction are up and down.

3. The method of claim 1, wherein the first direction and the second direction are left and right.

4. The method of claim 1, wherein the method is performed for a one dimensional array and the images are successive columns of the array.

5. The method of claim 1, wherein the method is performed for a two-dimensional array, and further comprising the steps of repeating the subtracting, adding and dividing steps for a second dimension in directions orthogonal to those for a first dimension.

6. The method of claim 1, further comprising the step of determining if the relative motion exceeds a threshold.

7. The method of claim 1, further comprising the step of using local scene data to locally limit application of the method.

8. The method of claim 1, wherein the step of determining whether there is relative motion is performed by differencing two fields of the scene.

9. The method of claim 1, wherein the step of determining whether there is relative motion is performed by determining at least one partial area of motion.

10. The method of claim 1, wherein the step of determining whether there is relative motion is performed by determining global motion.

11. The method of claim 1, further comprising the step of compensating for non-uniform gain.

12. The method of claim 1, wherein the non-uniformity compensation process further comprises the step of applying a weighting factor operable to slow convergence of the compensation process.

13. A ditherless method of compensating non-uniformities among detector elements of an infrared detector array that captures images of a scene, where each detector element of the array has at least one neighbor, comprising the steps of:
  determining whether there is relative motion of at least a portion of the scene and the detector array;
  if there is relative motion, performing a non-uniformity compensation process as follows:
  receiving two sets of output values, each set representing two matrices of output data from said array, the sets being from a first field and a second field detected by the array at different times;
  applying any previously calculated offset correction values to the output values;
  calculating first new offset correction values by performing the following operations for each detector element:
  averaging an output value of at least one first neighbor and an output value of that detector element, and subtracting the average from the output value of that detector element;
  correcting said output values with said first new offset correction values;
  calculating second new offset correction values by performing the following operations for each detector element: averaging an output value of at least one second neighbor and an output value of that detector element, and subtracting the average from the output value of that detector element;
  updating any previously calculated offset correction values with the first new offset correction values and the second new offset correction values; and repeating the above steps for a desired number of iterations.

14. The method of claim 13, wherein said calculating steps are further performed by including output values from one or more additional neighbors in said averaging.

15. The method of claim 13, wherein said steps are repeated until said second new offset correction values become substantially constant.

16. The method of claim 13, wherein said array is a two-dimensional array and further comprising the steps of repeating the calculating and correcting steps for a second dimension in directions orthogonal to those for a first dimension.

17. The method of claim 13, wherein said calculating steps are performed with an even number of neighbors, said neighbors forming a symmetrical pattern with respect to that detector element.

18. The method of claim 13, further comprising the step of determining if the relative motion exceeds a threshold.

19. The method of claim 13, wherein the step of determining whether there is relative motion is performed by differencing two fields of the scene.

20. The method of claim 13, wherein the step of determining whether there is relative motion is performed by determining at least one partial area of motion.

21. The method of claim 13, wherein the step of determining whether there is relative motion is performed by determining global motion.

22. The method of claim 13, further comprising the step of compensating for non-uniform gain.

23. The system of claim 22, wherein the motion detection process is performed by determining if the relative motion exceeds a threshold.

24. The method of claim 13, wherein the non-uniformity compensation process further comprises the step of applying a weighting factor operable to slow convergence of the compensation process.

25. An infrared detector system for providing images of a scene without dithering, comprising:
  a detector having an array of detector elements; an analog to digital converter associated with each detector element; and
  a processing system programmed to receive data from the analog to digital converters and to process the data to provide an infrared image, the processing using a motion detection process that detects whether there is relative motion between at least a portion of the scene and the detector array, and a non-uniformity compensation (NUC) process that implements a spatial low pass filter and uses temporarily shifted data from near neighbor detector elements in a bi-directional pattern.

26. The system of claim 25, wherein the NUC algorithm is an orthogonal algorithm.

27. The system of claim 25, wherein the NUC algorithm is a one-dimensional algorithm.

28. The system of claim 25, wherein the NUC algoritym is a two-dimensional algorithm.

29. The system of claim 25, wherein the motion detection process is performed by differencing two fields of the scene.

30. The system of claim 25, wherein the motion detection process is performed by determining at least one local area of motion.

31. The system of claim 25, wherein the step of determining whether there is relative motion is performed by determining global motion.

32. The system of claim 25, wherein the NUC process compensates for both offset and gain non-uniformity.

33. The system of claim 25, wherein the non-uniformity compensation process further comprises the step of applying a weighting factor operable to slow convergence of the compensation process.

34. A ditherless method of compensating non-uniformities among detector elements of an infrared detector array that captures images of a scene, where each detector element of the array has at least one neighbor, comprising the steps of:
  determining whether there is relative motion of at least a portion of the scene and the detector array; and
  if there is relative motion, performing a non-uniformity compensation process as follows: receiving at least two sets of output values, each set representing two matrices of output values from the array, the sets being from different fields detected by the array at different times; applying any calculated offset correction values to the output values; calculating new offset correction values for each detector element by using a value from that detector element and values from its bi-directional neighbors to implement a mathematical spatial low pass filter; updating any previously calculated offset correction values with the new offset correction values; and repeating the above steps for a desired number of iterations.

35. The method of claim 34, wherein the bi-directional neighbors are up and down.

36. The method of claim 34, wherein the bi-directional neighbors are left and right.

37. The method of claim 34, wherein the bi-directional neighbors are diagonal.

38. The method of claim 34, wherein the method is performed for a one dimensional array and the images are successive columns of the array.

39. The method of claim 34, wherein the method is performed for two-dimensional array, and further comprising the steps of repeating the subtracting, adding and dividing steps for a second dimension in directions orthogonal to those for a first dimension.

40. The method of claim 34, further comprising the step of determining if the relative motion exceeds a threshold.

41. The method of claim 34, further comprising the step of using local scene data to locally limit application of the method.

42. The method of claim 34, wherein the step of determining whether there is relative motion is performed by differencing two fields of the scene.

43. The method of claim 34, wherein the step of determining whether there is relative motion is performed by determining at least one local area of motion.

44. The method of claim 34, wherein the step of determining whether there is relative motion is performed by determining global motion.

45. The method of claim 34, further comprising the step of compensating for non-uniform gain.

46. The method of claim 34, wherein the non-uniformity compensation process further comprises the step of applying a weighting factor operable to slow convergence of the compensation process.

* * * * *

UNITED STATES PATENT AND TRADEMARK OFFICE
CERTIFICATE OF CORRECTION

PATENT NO.   : 6,507,018 B2
DATED        : January 24, 2003
INVENTOR(S)  : Ching-ju Young It is certified that error appears in the above-identified patent and that said Letters Patent is hereby corrected as shown below:

Column 3,
Line 33, after "entitled" insert -- " --.

Column 16,
Line 46, delete "LLNS" and insert -- LLNs --.
Line 51, delete "Field$_n$+2" and insert -- Field$_{n+2}$ --.

Column 17,
Line 53, delete "[*Offsest*]$^1$" and insert -- [*Offset*]$^1$ --.

Column 19,
Line 42, after "Substitute (6) and (7) into (4)" delete the equation "(8)" and insert --

$$[OC]_{UN} = \frac{1}{2} \cdot \left\{ \left( [I]_2 - \frac{1}{2} \cdot [I]_1 + \frac{1}{2} \cdot [I]_2^{\downarrow} \right) - \left( \frac{1}{2} \cdot [I]_1 + \frac{1}{2} \cdot [I]_2^{\downarrow} \right)^{\uparrow} \right\}$$

$$= \frac{1}{2} \cdot \left( [I]_2 - \frac{1}{2} \cdot [I]_1 + \frac{1}{2} \cdot [I]_2^{\downarrow} - \frac{1}{2} \cdot [I]_1^{\uparrow} - \frac{1}{2} \cdot [I]_2 \right)$$

--.

Signed and Sealed this

Fifth Day of August, 2003

JAMES E. ROGAN
*Director of the United States Patent and Trademark Office*